(12) United States Patent
Kono

(10) Patent No.: US 9,653,761 B2
(45) Date of Patent: May 16, 2017

(54) SECONDARY BATTERY PACK AND AUTHENTICATION METHOD

(71) Applicant: NEC ENERGY DEVICES, LTD., Sagamihara-shi, Kanagawa (JP)

(72) Inventor: Makoto Kono, Kanagawa (JP)

(73) Assignee: NEC ENERGY DEVICES, LTD., Sagamihara-shi, Kanagawa (JP)

( * ) Notice: Subject to any disclaimer, the term of this patent is extended or adjusted under 35 U.S.C. 154(b) by 149 days.

(21) Appl. No.: 14/421,230

(22) PCT Filed: Jun. 25, 2013

(86) PCT No.: PCT/JP2013/067317
§ 371 (c)(1),
(2) Date: Feb. 12, 2015

(87) PCT Pub. No.: WO2014/045659
PCT Pub. Date: Mar. 27, 2014

(65) Prior Publication Data
US 2015/0207185 A1  Jul. 23, 2015

(30) Foreign Application Priority Data

Sep. 18, 2012 (JP) ................................. 2012-204150

(51) Int. Cl.
| | |
|---|---|
| *H02J 7/00* | (2006.01) |
| *H01M 10/46* | (2006.01) |
| *H01M 10/42* | (2006.01) |
| *H01M 10/0525* | (2010.01) |

(52) U.S. Cl.
CPC ....... *H01M 10/46* (2013.01); *H01M 10/4257* (2013.01); *H02J 7/008* (2013.01); *H02J 7/0052* (2013.01); *H01M 10/0525* (2013.01); *H01M 2220/20* (2013.01); *Y02E 60/122* (2013.01)

(58) Field of Classification Search
CPC .................................................. H02J 7/0042
USPC ........................................................ 320/107
See application file for complete search history.

(56) References Cited

U.S. PATENT DOCUMENTS

| | | | | |
|---|---|---|---|---|
| 5,656,917 A | * | 8/1997 | Theobald | .............. H02J 7/0006 320/106 |
| 6,160,381 A | | 12/2000 | Peterzell | |
| 2007/0108940 A1 | | 5/2007 | Sainomoto et al. | |
| 2010/0129700 A1 | | 5/2010 | Tanno | |
| 2010/0295503 A1 | * | 11/2010 | Bourilkov | ............. H02J 7/0006 320/106 |
| 2011/0270480 A1 | | 11/2011 | Ishibashi et al. | |
| 2011/0299209 A1 | | 12/2011 | Tajima et al. | |

FOREIGN PATENT DOCUMENTS

| | | |
|---|---|---|
| CN | 102290612 A | 12/2011 |
| EP | 1667306 A1 | 6/2006 |
| EP | 1796243 A2 | 6/2007 |
| JP | 2005-110347 A | 4/2005 |
| JP | 2009-195014 A | 8/2009 |
| JP | 2013-051797 A | 3/2013 |
| WO | 2010/095292 A1 | 8/2010 |

OTHER PUBLICATIONS

Communication dated Apr. 19, 2016, issued by the European Patent Office in corresponding European Application No. 13838629.7.
International Search Report for PCT/JP2013/067317 dated Aug. 20, 2013.
Communication dated Aug. 25, 2016 from the State Intellectual Property Office of the P.R.C. in counterpart application No. 201380047814.4.

* cited by examiner

*Primary Examiner* — Arun Williams
(74) *Attorney, Agent, or Firm* — Sughrue Mion, PLLC

(57) ABSTRACT

An authenticator (5, 11) is compatible with a plurality of authentication systems to authenticate an external device connected with a connection terminal (OUT, ID), and the authenticator executes authentication processes by the plurality of authentication systems in order, and permits transfer of electric power between the external device and a secondary battery part (1) when any one of authentication processes is successful.

9 Claims, 3 Drawing Sheets

SECONDARY BATTERY PACK AND AUTHENTICATION METHOD

CROSS REFERENCE TO RELATED APPLICATIONS

This application is a National Stage of International Application No. PCT/JP2013/067317 filed Jun. 25, 2013, claiming priority based on Japanese Patent Application No. 2012-204150 filed Sep. 18, 2012, the contents of all of which are incorporated herein by reference in their entirety.

TECHNICAL FIELD

The present invention relates to a secondary battery pack executing an authentication process of an external device.

BACKGROUND ART

When an irregular external device is used as an external device that transmits or receives electric power to/from a secondary battery, current that does not comply with the specifications of the secondary battery may flow into the secondary battery, resulting in a possibility that the secondary battery will fail. Therefore, a technique of preventing a failure of the secondary battery is used in which an authentication process of a secondary battery pack including a secondary battery and an external device is executed.

For example, Patent Literature 1 discloses an information processer that authenticates a secondary battery pack. The information processer executes a first authentication process that uses a first authentication ID stored in the secondary battery pack and a second authentication process that uses second and third authentication IDs stored in the secondary battery pack, and when both the authentication processes are successful, charge of the secondary battery pack is performed.

CITATION LIST

Patent Literature

Patent literature 1
JP2009-195014A

SUMMARY OF INVENTION

Technical Problem

In the technique disclosed by Patent Literature 1, since the authentication process is executed by using the authentication ID, an external device that can be used as a battery charger is used only for the secondary battery pack, and thus, even if there is a general battery charger that complies with specifications, the battery charger cannot be used and this lead to a problem of high cost.

Regarding this point, instead of executing an authentication process using an authentication ID, a possible authentication process is an authentication process executed based on a value of current flowing into the secondary battery. Specifically, when the value of the current flowing into the secondary battery falls within a predetermined range that meets the specifications of the secondary battery, a successful authentication process allows the general battery charger compliant with the specifications of the secondary battery to be used.

However, in a case where the secondary battery pack is connected to an external device such as an electric power-assisted bicycle and regenerative current is supplied from the external device to the secondary battery pack, the value of the regenerative current varies depending on the situation, and thus, the value of the regenerative current does not necessarily fall within a predetermined current range. Therefore, if an authentication process is executed based on the value of current flowing into a secondary battery, determination may be made that an external device is an irregular battery charge which would prevent charging with regenerative current.

An object of the present invention is to provide a secondary battery pack that allows for usage of a general battery charger compliant with specifications thereof while allowing for charging with regenerative current, and an authentication method.

Solution to Problem

A secondary battery pack of the present invention includes: a secondary battery part; a connection terminal connectable with an external device that transmits or receives electric power to/from the secondary battery part; and an authenticator that is compatible with a plurality of authentication systems to authenticate the external device connected with the connection terminal, the authenticator configured to execute authentication processes by the plurality of authentication systems in order and permitting transfer of electric power between the external device and the secondary battery part when any one of the authentication processes is successful.

An authentication method of the present invention is an authentication method performed in a secondary battery pack including a secondary battery part and a connection terminal connectable with an external device that transmits or receives electric power to/from the secondary battery, the secondary battery pack being compatible with a plurality of authentication systems to authenticate the external device connected with the connection terminal, the method comprising: executing authentication processes by the plurality of authentication systems in order; and permitting transfer of electric power between the external device and the secondary battery part when any one of the authentication processes is successful.

Advantageous Effects of Invention

According to the present invention, it is possible to use a general battery charger compliant with the specifications while allowing for charging with regenerative current.

DESCRIPTION OF EMBODIMENTS

Figure 1:
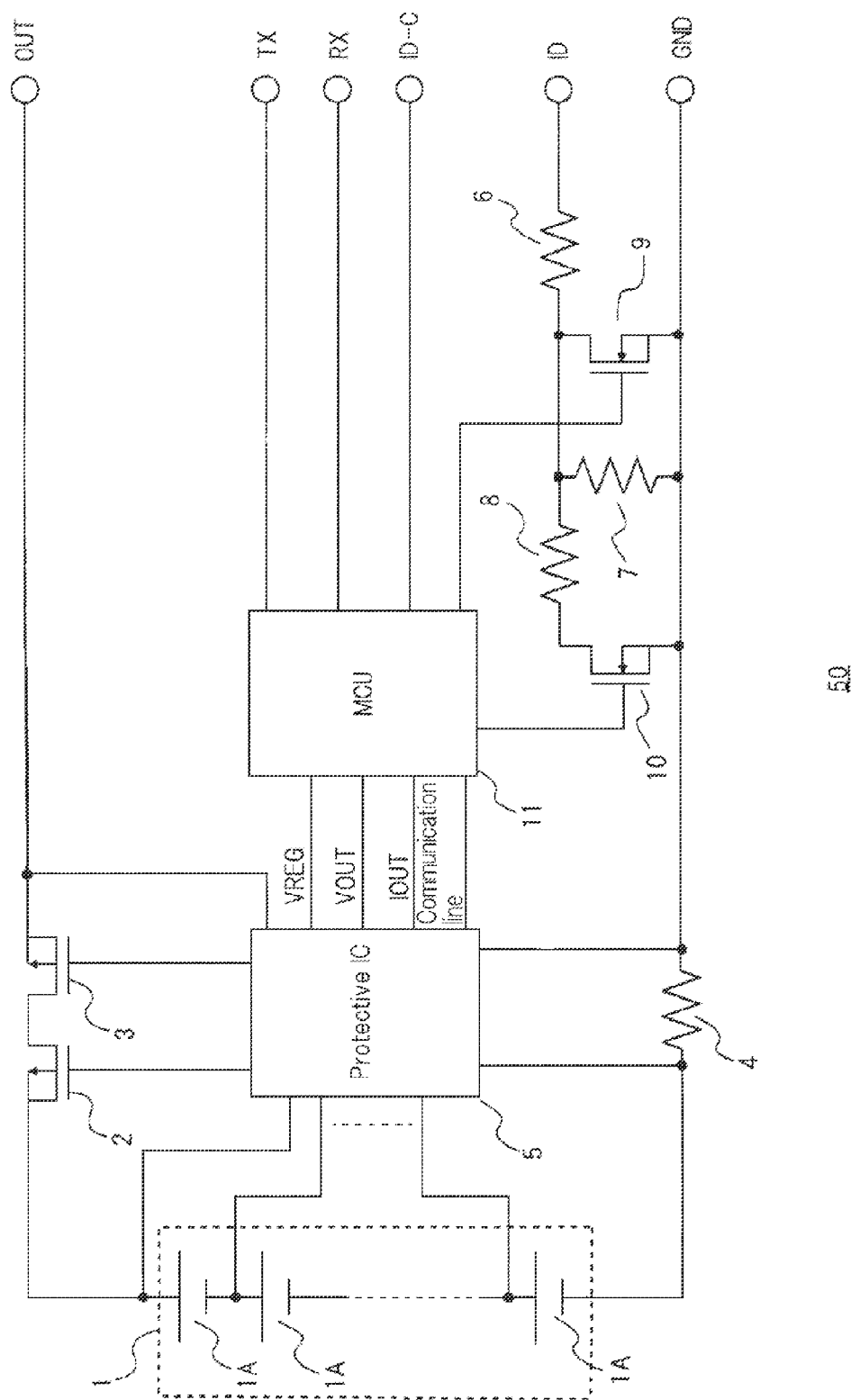
FIG. 1 is a diagram illustrating a configuration of a secondary battery pack of a first exemplary embodiment.

Hereinafter, description will be given of exemplary embodiments with reference to the drawings. In the following descriptions, components with the same functions are denoted by the same reference character, and description thereof is omitted in some cases.

FIG. 1 is a diagram illustrating a configuration of a secondary battery pack of a first exemplary embodiment. In FIG. 1, secondary battery pack 50 includes secondary battery part 1, discharge FET (field effect transistor) 2, charge FET 3, sense resistor 4, protective IC 5, ID authentication resistors 6 to 8, switches 9 and 10, MCU (micro control unit) 11 and a grounding terminal GND.

Secondary battery pack 50 further includes, as a connection terminal connectable with an external device, output terminal OUT, transmitting terminal TX, receiving terminal RX, authentication terminal ID, and authentication cancellation terminal ID-C. Output terminal OUT and authentication terminal ID are used for transmitting or receiving electric power to/from the external device, and transmitting terminal TX, receiving terminal RX and the authentication cancellation terminal are used for communicating with the external device.

The external device is, for example, a battery charger supplying electric power to secondary battery pack 50 or a load device operating with electric power from secondary battery pack 50. In the following description, the external device is a battery charger. Also, the battery charger includes a device supplying electric power by regenerative current to secondary battery pack 50, such as an electric power-assisted bicycle.

Secondary battery part 1 is configured by a rechargeable secondary battery cell. Further, a positive electrode of secondary battery part 1 is connected to output terminal OUT, and a negative electrode of secondary battery part 1 is connected to authentication terminal ID and grounding terminal GND.

In the present exemplary embodiment, secondary battery part 1 has a configuration in which a plurality of secondary battery cells 1A are respectively connected in series. However, secondary battery part 1 may be configured by a single secondary battery cell, or may have a configuration in which a plurality of secondary batteries are respectively connected in parallel or in matrix. Also, the type of secondary battery cell 1A is not particularly limited, but secondary battery cell 1A is, for example, a lithium ion secondary battery cell.

Discharge FET 2, which is a switch controlling discharge current output from secondary battery part 1, is disposed between secondary battery part 1 and output terminal OUT. Charge FET 3, which is a switch controlling charge current supplied to secondary battery part 1, is disposed between secondary battery part 1 and output terminal OUT. In the present exemplary embodiment, charge FET 3 is disposed between discharge FET 2 and output terminal OUT. Further, discharge FET 2 and charge FET 3 are a p-type FET.

Sense resistor 4, which is a resistor for sensing charging current and discharging current of secondary battery part 1, is disposed between secondary battery part 1 and authentication terminal ID. In the following description, charging current and discharging current are correctively referred to as charging/discharging current, in some cases.

Protective IC 5 measures a resistance voltage which is a voltage across the ends of sense resistor 4, and senses charging/discharging current flowing into secondary battery part 1 based on the resistance voltage. Protective IC 5 notifies MCU 11 of the value of the sensed charging/discharging current. Also, protective IC 5 senses a battery voltage which is the voltage across the ends of each secondary battery cell 1A.

The protective IC determines whether an abnormality such as overcharge, overdischarge and overcurrent to secondary battery part 1 occurs based on the sensed charging/discharging current and battery voltage, and the protective IC uses discharge FET 2 and charge FET 3 to protect secondary battery part 1 when the abnormality occurs.

For example, when at least any one of the respective battery voltages is equal to or more than the overcharge threshold, protective IC 5 determines that overcharge to secondary battery cell 1A has occurred, and turns off charge FET 3 to protect secondary battery part 1 from overcharge.

Moreover, when at least any one of the respective battery voltages is equal to or less than the overdischarge threshold, protective IC 5 determines that overdischarge of secondary battery part 1 has occurred, and turns off discharge FET 2 to protect secondary battery part 1 from overdischarge.

Furthermore, when charging/discharging current is equal to or more than the overcurrent threshold, protective IC 5 determines that overcurrent to secondary battery part 1 has occurred, and turns off discharge FET 2 to protect secondary battery part 1 from overcurrent.

ID authentication resistors 6 to 8 and switches 9 and 10 are circuits for altering the resistance value viewed from authentication terminal ID.

One end of ID authentication resistor 6 is connected to authentication terminal ID, while the other end is connected to one of the ends of ID authentication resistors 7 and 8 and switch 9. The other end of ID authentication resistor 8 is connected to one end of switch 10. The other ends of ID authentication resistor 7 and switches 9 and 10 are connected to sense resistor 4. In the present exemplary embodiment, switches 9 and 10 are configured by an n-type FET.

MCU 11 switches on/off of switches 9 and 10 to switch the resistance value viewed from authentication terminal ID (more specifically, a resistance value across authentication terminal ID and sense resistor 4).

At that time, when MCU 11 turns off both switches 9 and 10, the resistance value viewed from authentication terminal ID is a series resistance value of ID authentication resistors 6 and 7. When MCU 11 turns off switch 9 and turns on switch 10, the resistance value viewed from authentication terminal ID is a series resistance value of ID authentication resistor 6 and a parallel resistance value of ID authentication resistor 7 and ID authentication resistor 8. When MCU 11 turns on switch 9, irrespective of whether switch 10 is turned on or turned off, the resistance value viewed from authentication terminal ID is the resistance value of ID authentication resistor 6.

As described so far, in the present exemplary embodiment, MCU 11 can switch on/off of switches 9 and 10 to make the resistance value viewed from authentication terminal ID switchable in three ways.

MCU 11 assigns a state in which switch 9 is on so that it is in a charging stop state in which charging of secondary battery part 1 is stopped, assigns a state in which switch 9 is off and switch 10 is on so that they are in a normal charge state in which secondary battery part 1 is charged by normal current, and assigns a state in which switches 9 and 10 are off so that they are in to a pre-charge state in which secondary battery part 1 is charged by pre-charge current that is smaller than the normal current, and thus, the charging state of secondary battery part 1 is managed. In the charging stop state, MCU 11 turns off charge FET 3 via protective IC 5, while in the normal charge state and the pre-charge state, MCU 11 turns on charge FET 3 via protective IC 5.

MCU 11 functions as an authenticator that is compatible with a plurality of authentication systems to authenticating an external device connected with the connection terminal, executes authentication processes performed by the respective authentication systems in order, and permits transfer of electric power between the external device and secondary battery part 1 when any one of the plurality of the authentication systems is successful. The authentication time period required for completing the determination of whether an authentication process is or not possible is different among the respective authentication systems, and the authenticator executes the plurality of authentication systems in order starting from an authentication system having the shortest authentication time period.

Next, description will be given of a specific example of authentication processing by MCU 11 to authenticate an external device.

In the following description, an authentication system includes a first authentication system that executes an authentication process for authenticating an external device based on an external signal input from the external device, and a second authentication system that executes an authentication process for authenticating the external device based on a value of charging current supplied from the external device to secondary battery part 1. Also, the authentication time period of the first authentication system is shorter than the authentication time period of the second authentication system, and therefore, MCU 11 first executes the authentication process of the first authentication system, and second executes the authentication process of the second authentication system.

The external signal is a signal for executing an authentication process of an external device. In the present exemplary embodiment, the external device inputs an ID cancellation signal indicating whether the second authentication system is to be executed, as an external signal, to MCU 11 via an ID cancellation terminal ID-C. Also, the ID cancellation signal indicates execution of the authentication process of the second authentication system in the case of an H level, while indicating no execution of the second authentication system in a case of an L level.

First, at the timing to start charging secondary battery part 1 in the charging stop state, MCU 11 determines whether an external signal input from the external device is the H level or the L level, as the authentication process of the first authentication system.

If the ID cancellation signal is the L level, MCU 11 determines that the authentication process of the first authentication system is successful, and permits the external device to charge secondary battery part 1.

On the other hand, if the ID cancellation signal is the H level, MCU 11 determines that the authentication process of the first authentication system is failed, and executes an authentication process of the second authentication system.

Specifically, MCU 11 turns off switches 9 and 10 and turns off charge FET 3 via protective IC 5 to transit to the pre-charge state. Then, MCU 11 determines whether the value of charging/discharging current output from protective IC 5 falls within a set value range, which is a predetermined current value range, as the second authentication system. The set value range is a range of the value of current that complies with specifications of secondary battery part 1 in the pre-charge state, which is, for example, a range equal to or lower than 0.1 ItA.

If the value of the charging/discharging current falls within the set value range, MCU 11 determines that the authentication process of the second authentication system is successful, and permits the external device to charge secondary battery part 1. On the other hand, if the value of charging/discharging current does not fall within the set value range, MCU 11 determines that the authentication process by the second authentication system has failed, and transits to the charging stop state to stop the external device from charging secondary battery part 1.

Next, operation of secondary battery pack 50 will be described.

Figure 2:
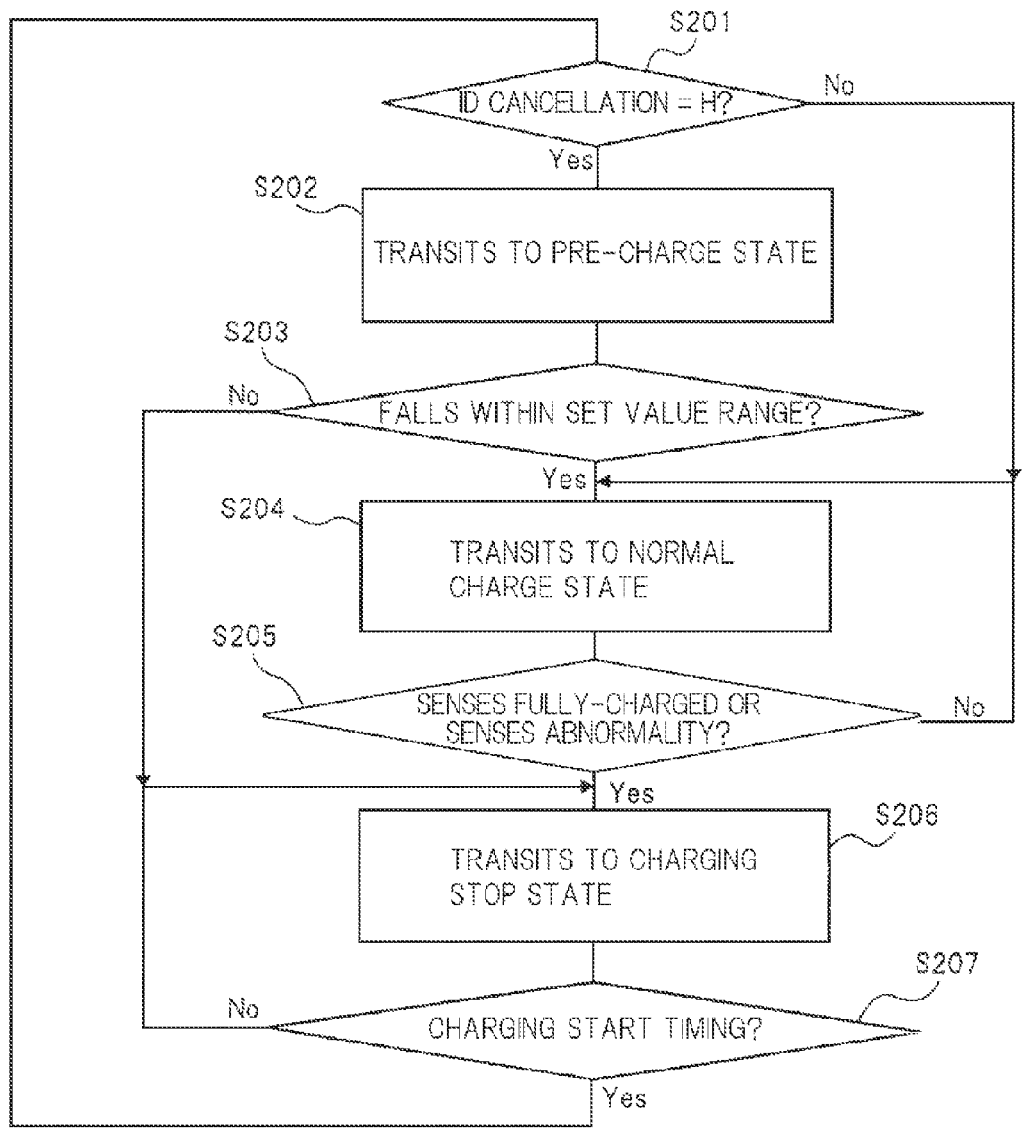
FIG. 2 is a flowchart explaining an operation of the secondary battery pack of the first exemplary embodiment.

FIG. 2 is a flowchart explaining an example of the operation of secondary battery pack 50. In the operation described below, an authentication system includes the first authentication system and the second authentication system, as in the aforementioned specific example.

At the charging start timing to start charging by the external device when the external device has been connected to secondary battery pack 50, MCU 11 determines whether an ID cancellation signal that was input to authentication cancellation terminal ID-C is the H level or not (step S201).

If the ID cancellation signal is the H level, MCU 11 determines that the first authentication process is failed, and turns off both switches 9 and 10 and turns on charge FET 3 via protective IC 5 to transit to the pre-charge state (step S202).

When transiting to the pre-charge state, MCU 11 checks a value of the charging current output from protective IC 5, and determines whether or not the value of the charging current falls within the set value range (step S203).

If the ID cancellation signal is the L level at step S201 and the value of the charging current falls within the set value range at step S203, MCU 11 determines that the authentication process is successful, and turns off switch 9 and turns on switch 10 to transit to the normal charge state (step S204). At that time, if the charge FET is off (if the ID cancellation signal is the L level at step S201), MCU 11 turns on charge FET 3 via protective IC 5.

Accordingly, secondary battery part 1 is charged. Thereafter, MCU 11 determines whether it is at the charging end timing to end charging of secondary battery part 1 (step S205). For example, if protective IC 5 senses, based on the battery voltage or the charging/discharging current, that secondary battery part 1 is fully-charged or that secondary battery part 1 is abnormal, protective IC 5 notifies MCU 11 of an end signal indicating that effect. Then, if MCU 11 receives the end signal, MCU 11 determines that it is at the charging end timing. If MCU 11 does not receive the end signal, MCU 11 determines that it is not at the charging end timing.

If the value of the charging current does not fall within the set current value range at step S203, and if the charging end timing is sensed at step S205, MCU 11 turns on switch 9 and turns off the charge FET via protective IC 5 to transit to the charging stop state (step S206).

Thereafter, MCU 11 determines whether it has been at the charging start timing or not (step S207). For example, if protective IC 5 senses, based on the battery voltage or the charging/discharging current, that the fully-charged state of secondary battery part 1 ends or that the abnormality of secondary battery part 1 is eliminated, protective IC 5 notifies MCU 11 of a start signal indicating that effect. Then, if MCU 11 receives the start signal, MCU 11 determines that it is at the charging start timing. If MCU 11 does not receive the start signal, MCU 11 determines that it is not at the charging start timing.

If it is at the charging start timing, MCU 11 returns to step S201. If it is not at the charging start timing, MCU 11 returns to step S206.

As described so far, according to the present exemplary embodiment, when authentication processes by a plurality of authentication systems are executed in order and when any one of the authentication processes is successful, transfer of electric power between the external device and secondary battery part 1 is permitted. Accordingly, if any one of an authentication process that allows for charging with regenerative current and an authentication process that allows for usage of a general battery charger compliant with the specifications is successful, transfer of electric power between the external device and secondary battery part 1 is permitted, and thus, it is possible to use the general battery charger that complies with the specifications, while allowing for charging with regenerative current.

Furthermore, in the present exemplary embodiment, the authentication processes of the authentication systems are executed in order starting from the authentication system with the shortest authentication time period, and thus, it is possible to reduce the time period required for the authentication process.

Moreover, as the authentication system, the first authentication system based on an external signal input from the external device is executed, and thus, if the battery charger which supplies regenerative current to secondary battery part 1 is only provided with a function for outputting an external signal, it is possible to easily execute an authentication process to allow for charging with the regenerative current.

Furthermore, as the authentication system, the second authentication system, in which an authentication process for the external device based on the value of current supplied to secondary battery part 1 is executed, and thus, it is possible to execute an authentication process to allow for usage of a general battery charger that complies with the specifications.

Next, a second exemplary embodiment will be described.

In the first exemplary embodiment, MCU 11 executes the authentication processes by the plurality of authentication systems in order. In the present exemplary embodiment, MCU 11 executes an authentication process of an authentication system selected from among a plurality of authentication systems. If the executed authentication process is successful, MCU 11 permits transfer of electric power between the external device and secondary battery part 1. Note that the authentication system in the present exemplary embodiment is, for example, the first and second authentication systems, which are exemplified in the first exemplary embodiment.

Figure 3:
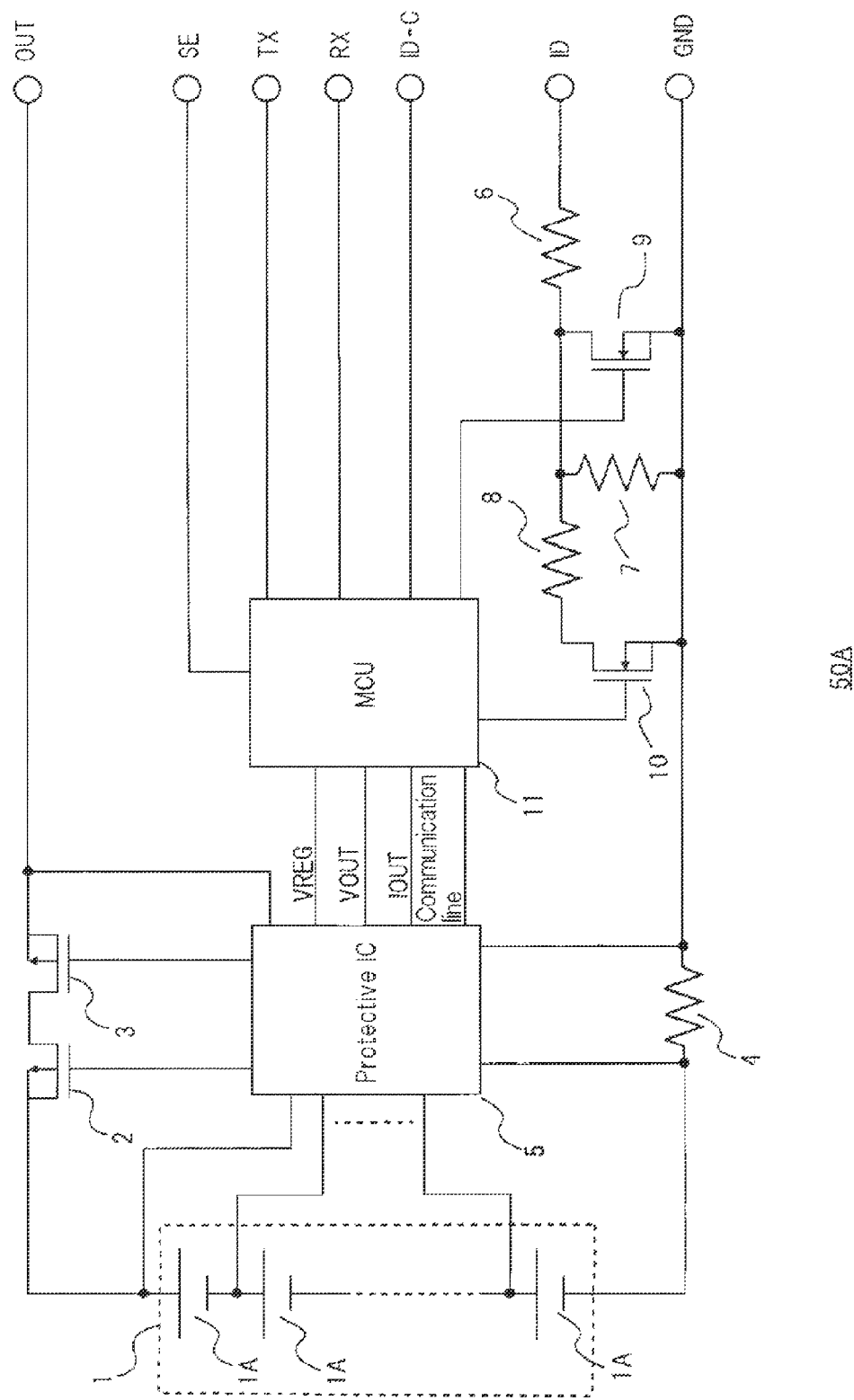
FIG. 3 is a diagram illustrating a configuration of a secondary battery pack of a second exemplary embodiment.

FIG. 3 is a diagram illustrating a configuration of secondary battery pack 50A of the present exemplary embodiment. Secondary battery pack 50A illustrated in FIG. 3 includes selection signal terminal SE in addition to the configuration of secondary battery pack 50 illustrated in FIG. 1.

A selection signal to select any authentication systems from among the plurality of authentication systems is input to selection signal terminal SE. For example, secondary battery pack 50A is provided with a switch for selecting any authentication systems from among the plurality of authentication systems, and when a user switches the switch, a selection signal is input from the switch to selection signal terminal SE.

MCU 11 selects any authentication systems from among the plurality of authentication systems, according to the selection signal input to selection signal terminal SE, and executes an authentication process of the selected authentication system. Then, if the executed authentication process is successful, MCU 11 permits transfer of electric power between the external device and secondary battery part 1.

It is also possible that secondary battery pack 50A is provided with a connection terminal that connects with the external device for each authentication system, MCU 11 senses the connection terminal connected with the external device, and selects any authentication systems from among the plurality of authentication systems according to the sensed connection terminal.

According to the present exemplary embodiment, it is necessary to select an authentication system, but it is possible to use a general battery charger compliant with the specifications, while allowing for charging with regenerative current, as in the first exemplary embodiment.

In the aforementioned exemplary embodiments, the illustrated configurations are only an example, and the present invention is not limited to the configurations.

For example, if the ID cancellation signal is the L level, the ID cancellation signal may indicate execution of the second authentication system, while if the ID cancellation signal is the H level, the ID cancellation signal may indicate non-execution of the second authentication system.

The present application claims the priority of Japanese Patent Application No. 2012-204150 filed on Sep. 18, 2012, the entire disclosure of which is incorporated herein.

REFERENCE SIGN LIST

1 secondary battery part
1A secondary battery cell
2 discharge FET
3 charge FET
4 sense resistor
5 protective IC
6 to 8 ID authentication resistor
9, 10 switch
11 MCU
50, 50A secondary battery pack

What is claimed is:

1. A secondary battery pack comprising:
   a secondary battery;
   a connection terminal connectable to an external device that transmits electric power to or receives the electric power from said secondary battery; and
   an authenticator compatible with a plurality of authentication systems to authenticate the external device connected to said connection terminal, the authenticator is configured to execute authentication processes of the plurality of authentication systems in order and to permit transfer of the electric power between the external device and said secondary battery in response to any one of the authentication processes being successful, wherein
   the external device is a battery charger that charges said secondary battery, and
   a first one of the plurality for authentication systems comprises a first one of the authentication processes of the external device and is executed based on a value of current supplied from the external device to said secondary battery.

2. The secondary battery pack according to claim 1, wherein an authentication time period required for completing determination of whether an authentication process is possible is different among the authentication systems.

3. The secondary battery pack according to claim 2, wherein the authenticator implements the plurality of authentication systems in order, starting from an authentication system comprising a shortest authentication time period.

4. The secondary battery pack according to claim 1, wherein any one of the plurality of authentication systems is a first authentication system in which an authentication process for the external device is executed based on an external signal for executing the authentication process for the external device, the external signal being input by the external device.

5. The secondary battery pack according to claim 4, wherein the authenticator first implements the first authentication system.

6. The secondary battery pack according to claim 5, wherein
a second one of the plurality of authentication systems comprises a second one of the authentication processes for the external device and is executed based on a second value of the current supplied from the external device to said secondary battery, and
the authenticator secondly implements the second authentication system.

7. The secondary battery pack according to claim 6, wherein, in the second one of the plurality of authentication systems, the second one of the authentication processes for the external device is executed based on whether the second value of the current falls within a predetermined current value range.

8. The secondary battery pack according to claim 4, wherein, in the first authentication system, the authentication process for the external device is executed based on whether the external signal is the H level or the L level.

9. An authentication method performed in a secondary battery pack comprising a secondary battery and a connection terminal connectable to an external device that transmits electric power to or receives the electric power from the secondary battery, the secondary battery pack being compatible with a plurality of authentication systems to authenticate the external device connected to the connection terminal, the method comprising:
executing authentication processes by the plurality of authentication systems in order; and
permitting transfer of the electric power between the external device and the secondary battery in response to any one of the authentication processes being successful, wherein
the external device is a battery charger that charges said secondary battery, and
a first one of the plurality for authentication systems comprises a first one of the authentication processes of the external device and is executed based on a value of current supplied from the external device to said secondary battery.

\* \* \* \* \*